(12) United States Patent
Villares et al.

(10) Patent No.: US 8,500,068 B2
(45) Date of Patent: Aug. 6, 2013

(54) ARRANGEMENT OF A CIRCUMFERENTIAL JOINT OF STRUCTURAL ELEMENTS WITH A COUPLING ELEMENT MANUFACTURED IN COMPOSITE MATERIAL

(75) Inventors: Enrique Vera Villares, Madrid (ES); Jose Maria Pina Lopez, Madrid (ES); Ignacio Jorge Outon Hernandez, Madrid (ES)

(73) Assignee: Airbus Operations, S.L., Madrid (ES)

( * ) Notice: Subject to any disclaimer, the term of this patent is extended or adjusted under 35 U.S.C. 154(b) by 351 days.

(21) Appl. No.: 12/876,875

(22) Filed: Sep. 7, 2010

(65) Prior Publication Data

US 2011/0095129 A1    Apr. 28, 2011

(30) Foreign Application Priority Data

Sep. 30, 2009    (ES) .................................. 200930765

(51) Int. Cl.
*B64C 1/12*    (2006.01)
(52) U.S. Cl.
USPC .......................... 244/132; 244/131; 403/374.1
(58) Field of Classification Search
USPC ............... 244/131, 132, 129.1, 119; 403/334, 403/339, 340, 374.1, 368
See application file for complete search history.

(56) References Cited

U.S. PATENT DOCUMENTS

| 4,793,727 | A  | * | 12/1988 | Schmaling ..................... 403/340 |
| 5,281,454 | A  | * | 1/1994  | Hanson ........................ 428/36.3 |
| 2008/0210819 | A1 | * | 9/2008 | Jarsaillon et al. ............. 244/120 |
| 2009/0020646 | A1 | * | 1/2009 | Normand et al. ............. 244/120 |
| 2009/0266870 | A1 | * | 10/2009 | Yousefiani et al. ......... 228/112.1 |
| 2011/0031350 | A1 | * | 2/2011 | Sayilgan et al. ............... 244/131 |

FOREIGN PATENT DOCUMENTS

| WO | 2009/056319 A1 | 5/2009 |
| WO | 2009/065587 A1 | 5/2009 |

* cited by examiner

*Primary Examiner* — Timothy D Collins
*Assistant Examiner* — Jamie S Stehle
(74) *Attorney, Agent, or Firm* — Birch, Stewart, Kolasch & Birch, LLP

(57) ABSTRACT

A joint construction for an aeronautical structure made from composite material having an internal structural element and an adjoining skin element which define the aeronautical structure, which includes a coupling element disposed between and contiguous with the internal structural element and the adjoining skin element, wherein the coupling element has opposing adjoining diagonally configured end portions which form a wedge shaped diagonal joint therebetween which terminates at the internal structural element at one end and the skin element at the other end, and a plurality of rivets extending from the internal structured element to the adjoining skin, across the coupling element and across the diagonal joint.

17 Claims, 2 Drawing Sheets

ARRANGEMENT OF A CIRCUMFERENTIAL JOINT OF STRUCTURAL ELEMENTS WITH A COUPLING ELEMENT MANUFACTURED IN COMPOSITE MATERIAL

FIELD OF THE INVENTION

This invention refers to an arrangement of a circumferential joint of structural elements with a coupling element manufactured in composite material, and more specifically, to an arrangement of a circumferential joint of fuselage sections of an aircraft.

BACKGROUND OF THE INVENTION

Today and specifically in the aeronautic industry, organic matrix composite materials and continuous fibers are used, mainly based upon epoxy resins and carbon fibers in a large variety of structural elements.

As is well known, aeronautic structures demand the integration of several structural elements. For example, the fuselages require the integration of the skin with other structural elements such as the beams, frames or stringers, which poses different types of problems.

An area that is especially problematic is the circumferential joints of the aircraft fuselage skin sections that are manufactured in composite material, both when they are complete fuselage sections, i.e. closed sections in the shape of a "barrel", and when they are not. In these types of cases, the use of a coupling device ("butt strap") is known, in the shape of an internal ring that facilitates the abutment of the skin sections.

The coupling devices manufactured in composite material are normally manufactured in separate parts as solid parts of the rectangular section. In document WO 2009/065587 it describes a method for its manufacture, among other issues.

Other types of configurations of those coupling devices are also known, such as the one described in document WO 2009/056319, which is formed by a plurality of segments placed on top with lengthwise holes.

In the known joint arrangements, where two skin sections, the coupling device mentioned in the form of separate parts of the rectangular section, as well as an internal structural element necessary to provide continuity to beams, frames or stringers are involved, it is necessary to use auxiliary parts, which means several problems and specifically greater thickness in the joint area and a non-uniform surface in the support area of the internal structural element.

This invention is aimed at solving those problems.

SUMMARY OF THE INVENTION

One purpose of this invention is to provide an arrangement of a circumferential joint of structural elements with a coupling element manufactured in composite material, which minimizes the total thickness of the joint area.

Another purpose of this invention is to provide an arrangement of a circumferential joint of structural elements with a coupling element manufactured in composite material, which provides a uniform support surface to the internal structural element.

Another purpose of this invention is to provide an arrangement of a circumferential joint of structural elements with a coupling element manufactured in composite material that is optimized in weight.

Those and other purposes are achieved with a joint arrangement in an aeronautic structure that comprises two skin sections manufactured in composite material with an external and internal surface, a coupling element to facilitate the joint of adjoining skin sections, with an external and internal surface, manufactured in composite material in a plurality of separate parts, an internal structural element supported on the internal surface of said coupling element and a plurality of rivets, in which the ends of each pair of adjoining parts of the coupling element are formed into a wedge shape, with one of them pointing to the covering and the other to the internal structural element, with their inclined faces overlapping on the joining area.

In a preferred embodiment of this invention, said ends of each pair of adjoining parts in a wedge shape have their end edges dulled so that the length L2 of the overlapping area of the inclined faces is lower than the length L1 of the joint area of each pair of adjoining parts. A design of the wedges is therefore achieved that is suitable for the manufacturing of the parts of the coupling element in composite material.

In another preferred embodiment, the slope of said inclined faces comprises the range of $1/40$-$1/20$. A design of the wedges is therefore achieved that makes the suitability for their manufacturing in composite material compatible with the compliance with the requirements derived from the load transfer between them.

In another preferred embodiment, the rivets used on the joint area of the skin, the coupling element and the internal structural element have the same length and the same diameter. The embodiment of the joint is therefore facilitated.

In another preferred embodiment, in the overlapping area of the inclined faces, a plurality of rivet rows are used, which number is determined by the length L2 of said area and a predetermined distance between rivet rows, which is between four to six times the diameter of the rivets. A joint arrangement is therefore achieved that facilitates the load transfer on the overlapping area.

In another preferred embodiment, the joint arrangement is applied to the joining of closed aircraft fuselage sections in the shape of a barrel. An optimized joint arrangement is therefore achieved for the manufacturing and assembly of closed fuselage sections embodied in composite material.

Other characteristics and advantages of this invention will come from the detailed description that follows, of an embodiment that illustrates the purpose of the invention in relation to the attached figures.

DETAILED DESCRIPTION OF THE INVENTION

We will describe an embodiment of the invention for the case of a joint arrangement of two closed sections 13, 15 of the skin, 11 of the fuselage of an aircraft manufactured in composite material, a pair of parts 27, 29 of a coupling element 21 ("butt swap") in the shape of a ring embodied in composite material and an internal structural element 41. Rivets are used for joining the aforementioned elements (not represented except in FIG. 4).

As an expert in this area will well understand, the invention is not limited to joint arrangements of closed aircraft fuselage sections, but also is applicable to joint arrangements of non-closed aircraft fuselage sections, as well as to any other joint arrangement of components with similar characteristics.

Figure 1:
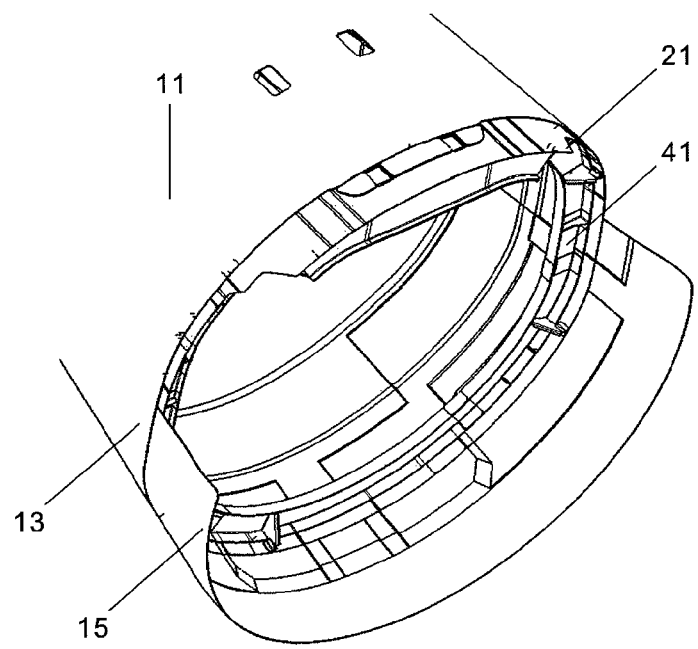
FIG. 1 is a perspective view of an aircraft fuselage, which illustrates the elements that take part in the joint arrangement to which this innovation refers.
Figure 2:
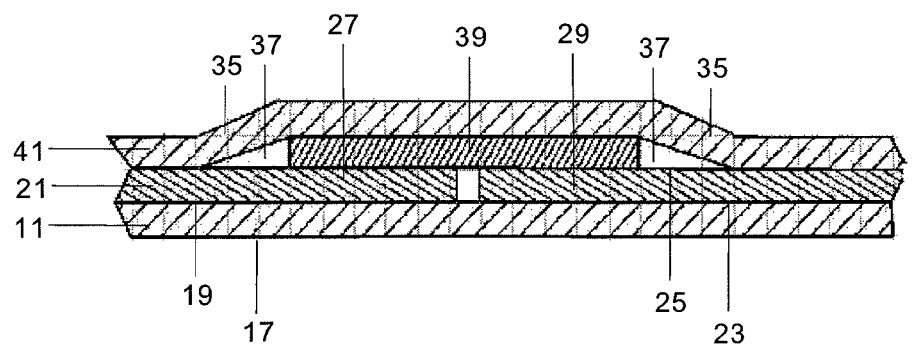
FIG. 2 is a schematic cross-section view of a known joint arrangement in the technique.

In the known technique, and as shown in FIG. 2, an auxiliary part 39 is used, which causes the following problems among others:

The coupling of structural element 41 requires that said element include some transition areas 35, which leave some gaps 37 in the joint.

There is a greater thickness to be joined at the joint.

The distance between rivets increases in said transition areas 35.

The number of parts increases with the consequent increases in documentation, identification and production costs.

There is no uniform surface where the structural element 41 can be supported.

Figure 3:
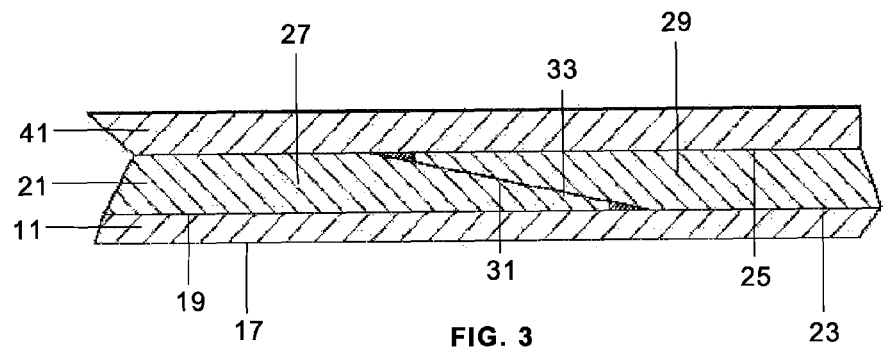
FIG. 3 is a schematic cross-section view of a joint arrangement according to this invention.
Figure 4:
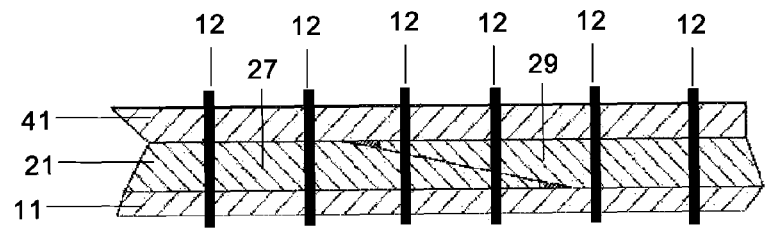
FIG. 4 is a schematic cross-section view of a joint arrangement according to this invention, including the rivets.
Figure 5:
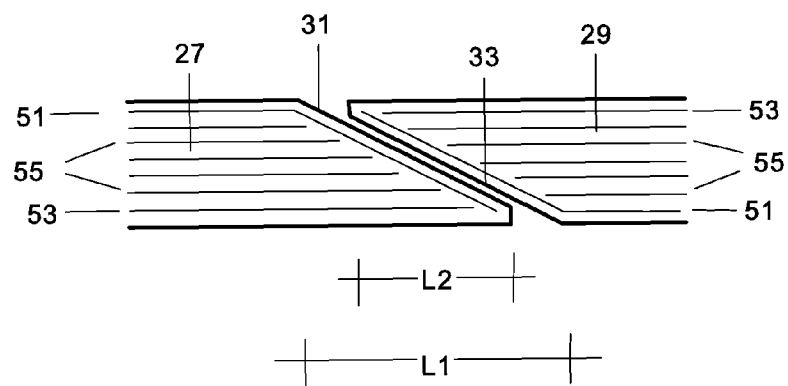
FIG. 5 is a cross-section view that schematically shows the lay-up of the coupling element that takes part in the joint arrangement according to this invention.

The basic idea of this invention for solving the aforementioned problem is, as illustrated in FIGS. 3 to 5, a wedge design of the two adjoining ends of each pair of parts 27, 29 of the coupling element 21, which allows the embodiment of an overlapped joint between both.

The wedge of part 27 points to the skin 11 and the wedge of part 29 points to the internal structural element 41, with the edges being dulled in both cases for construction reasons, with their respective faces 31, 33 being parallel to allow the overlapping of parts 27, 29. With that configuration, the loads of the coupling element 21 are distributed gradually onto each of the rivet rows 12 and are transferred from one part to another.

Following FIG. 5, it can be observed that the lay-up of parts 27, 29 of the coupling element 21 comprise lower and upper external plies 51, 53 and internal skins 55 that become lost from the inside of the lay-up. For construction reasons, there should be at least two upper and lower external plies (in FIG. 5 only one is represented); therefore parts 27, 29 cannot have sharp ends, but rather "dulled" ends with the thickness corresponding to the use of the four mentioned plies. As a consequence, it is worth speaking about the two lengths of the joint area: the extended length L1, which is what would correspond to hypothetical sharp wedges and the restricted length L2, which is that corresponding to the overlapping part of the inclined faces 31, 33.

In an example of the embodiment of the invention, the thickness of the sections 13, 15 of covering 11 was 3.5 mm, the thickness of the coupling element 21 was 3.5 mm, the thickness of the structural element 41 was 3 mm and the slope of the inclined faces 31, 33 was $1/20$. Four rows of rivets 12 were used that were 4.8 mm in diameter.

The slope of the inclined faces must be very smooth, both for the stacking requirements and in order to favor the transferring of loads from part 29 to part 27 being progressive, for which purpose there must be a minimal number of rivet rows on the overlapping area (the restricted length area L2).

Thus, in the joint arrangement that is the purpose of this invention, there are on the margin of the thicknesses of the parts, two relevant parameters: the slope of the inclined faces 31, 33 and the number of rivet rows on the overlapping area with restricted length L2.

For the range of thicknesses of composite material parts used in the aeronautics industry, particularly in fuselages, it is considered that in preferred embodiments of a joint arrangement as per this invention, the slope of the inclined faces 31, 33 must be between $1/40$ and $1/20$ and the number of rivet rows 12 between three and four, with the distance between them being from four to six times the diameter of the rivets.

Among the advantages of the joint arrangement as per this invention, it is worth pointing out the following:

It allows a simple geometric configuration both of the coupling element 21 and the structural element 41.

It minimizes the number of parts that are involved in the joint.

It allows a reduction in assembly times.

It allows more uniform distribution of the riveting.

It allows the unification of the riveting (equal diameter and equal length) on the joint.

It allows some more optimal riveting diameters by reducing the thickness in the joint areas (reduction of the t/d ratio–slenderness of the rivet).

It allows a reduction in weight as a consequence of the reduction in the number of parts and the greater effectiveness of the joint.

Although this invention has been described entirely in connection with preferred embodiments, it is evident that modifications can be entered into its scope, with said scope not being considered to be limited by the previous embodiments, but rather by the content of the following claims.

The invention claimed is:

1. A joint construction for an aeronautical structure made from composite material and having an internal structural element and an adjoining skin element which define said aeronautical structure, which comprises:

a coupling element disposed between and contiguous with said internal structural element and said adjoining skin element, wherein said coupling element has opposing, adjoining diagonally configured end portions which form a wedge shaped diagonal joint therebetween, said diagonal joint terminating at the internal structural element at one end and the skin element at the other end, and a plurality of rivets extending from the internal structural element to the adjoining skin element, across the coupling element and across the diagonal joint.

2. The joint construction of claim 1, wherein the outer end edges of the diagonal joint are cut off so that a length L2 of an overlapping area of the diagonal joint is less than a length L1 of a joint area of each pair of said opposing, adjoining diagonally configured end portions.

3. The joint construction of claim 2 wherein the skin pertains to the fuselage of an aircraft.

4. The joint construction of claim 2, wherein a plurality of rows of rivets are used in the overlapping area of the diagonal joint, the number being determined by the length L2 of said area and a predetermined distance between the rivet rows.

5. The joint construction of claim 4, wherein the predetermined distance between the rivet rows is between four to six times the diameter of the rivets.

6. The joint construction of claim 5 wherein the skin pertains to the fuselage of an aircraft.

7. The joint construction of claim 4 wherein the skin pertains to the fuselage of an aircraft.

8. The joint construction of claim 2, wherein the slope of the diagonal joint is between the range of $1/40$-$1/20$.

9. The joint construction of claim 2, wherein all the rivets have the same length and the same diameter.

10. The joint construction of claim 1, wherein the slope of the diagonal joint is in the range of $1/40$-$1/20$.

11. The joint construction of claim 10, wherein all the rivets have the same length and the same diameter.

12. The joint construction of claim 10 wherein the skin pertains to the fuselage of an aircraft.

13. The joint construction of claim 1, wherein all the rivets have the same length and the same diameter.

14. The joint construction of claim 13 wherein the skin pertains to the fuselage of an aircraft.

15. The joint construction of claim 1 wherein the skin pertains to the fuselage of an aircraft.

16. The joint construction of claim 15, wherein the skin has sections having a barrel shape.

17. The joint construction of claim 16, wherein the coupling element has a barrel section shape conforming with the shape of the skin sections joined thereto.

* * * * *